(12) United States Patent
Ziegler et al.

(10) Patent No.: US 7,323,521 B2
(45) Date of Patent: Jan. 29, 2008

(54) EPOXY POLYMER ADDITIVES FOR POWDER COATINGS

(75) Inventors: Michael J. Ziegler, Cranberry Township, PA (US); Anthony M. Chasser, Allison Park, PA (US); Jackie L. Kulfan, Mars, PA (US)

(73) Assignee: PP6 Industries Ohio, Inc., Cleveland, OH (US)

( * ) Notice: Subject to any disclaimer, the term of this patent is extended or adjusted under 35 U.S.C. 154(b) by 395 days.

(21) Appl. No.: 10/804,684

(22) Filed: Mar. 19, 2004

(65) Prior Publication Data

US 2005/0209415 A1 Sep. 22, 2005

(51) Int. Cl.
*C08G 59/14* (2006.01)
*C08L 33/08* (2006.01)
*C08L 67/02* (2006.01)
*C08L 71/02* (2006.01)
*C08L 75/04* (2006.01)

(52) U.S. Cl. .................. 525/438; 525/109; 525/110; 525/111; 525/113; 525/114; 525/405; 525/406; 525/407; 525/454; 528/112

(58) Field of Classification Search .............. None
See application file for complete search history.

(56) References Cited

U.S. PATENT DOCUMENTS

| | | | | |
|---|---|---|---|---|
| 3,382,210 A | | 5/1968 | Wyart et al. ................ 260/47 |
| 4,105,613 A | * | 8/1978 | Clope et al. ................ 523/416 |
| 4,521,570 A | | 6/1985 | Watanabe et al. ........... 525/415 |
| 4,522,984 A | * | 6/1985 | Watanabe et al. ........... 525/415 |
| 4,717,743 A | | 1/1988 | Wakabayashi et al. ....... 524/13 |
| 4,717,744 A | | 1/1988 | Boutevin et al. ............ 524/17 |
| 4,717,745 A | | 1/1988 | Ishii et al. .................. 524/91 |
| 4,812,535 A | | 3/1989 | Dervan et al. | |
| 5,037,899 A | * | 8/1991 | Nakamura et al. .......... 525/415 |
| 5,506,320 A | | 4/1996 | Yu ............................ 526/266 |
| 6,372,823 B1 | | 4/2002 | Furukawa et al. .......... 523/410 |

FOREIGN PATENT DOCUMENTS

| | | | |
|---|---|---|---|
| EP | 0276872 | | 12/1992 |
| EP | 0473088 | | 1/1998 |
| GB | 1523903 A | * | 9/1978 |
| GB | 2101605 | | 1/1983 |
| JP | 53-58536 A | * | 5/1978 |
| JP | 61044915 | | 3/1986 |
| JP | 61108623 | | 5/1986 |
| JP | 61223849 | | 10/1986 |
| JP | 61231019 | | 10/1986 |
| JP | 61241765 | | 10/1986 |
| JP | 62013431 | | 1/1987 |
| JP | 63074073 | | 4/1988 |
| JP | 63179918 | | 7/1988 |
| JP | 01009262 | | 1/1989 |
| JP | 01161067 | | 6/1989 |
| JP | 01263112 | | 10/1989 |
| JP | 03221517 | | 9/1991 |
| JP | 04055465 | | 9/1992 |
| JP | 07062216 | | 3/1995 |
| JP | 08034830 | | 2/1996 |
| JP | 2519907 | | 7/1996 |
| JP | 08182963 | | 7/1996 |
| JP | 2002146319 | | 5/2002 |

* cited by examiner

*Primary Examiner*—Robert Sellers
(74) *Attorney, Agent, or Firm*—Diane R. Meyers; Donald R. Palladino

(57) ABSTRACT

Comb polymers prepared by reacting an epoxy resin and a lactone are disclosed. These comb polymers find particular application as additives for powder coating compositions, to improve various performance properties thereof. Powder coating composition comprising the described comb polymers are also disclosed.

22 Claims, No Drawings

EPOXY POLYMER ADDITIVES FOR POWDER COATINGS

FIELD OF THE INVENTION

The present invention relates to powder coatings comprising a polymer additive. More specifically, the polymer additive comprises an epoxy resin to which is grafted linear moieties comprising lactone.

BACKGROUND INFORMATION

In recent years, powder coatings have become increasingly popular; because these coatings are inherently low in volatile organic content (VOC), their use significantly reduces air emissions during the application and curing processes. Powder coatings are typically cured by heating the coated substrate to an elevated temperature, such as higher than 125° C. During the curing process, the powder particles melt and spread, and the components of the powder coating react.

Powder coatings used today can be classified broadly in two distinct categories, ultraviolet durable and ultraviolet non-durable. Often, the durable powder compositions are brittle and the non-durable films, while flexible, may not give the desired durability. There is a need in the marketplace to have powder coatings that give flexible and durable films when cured. Such coatings would have widespread application, such as in high impact areas or environments requiring secondary post-forming stages, something that is not currently possible. In addition, good flow, leveling and/or handling of the powder is desired.

SUMMARY OF THE INVENTION

The present invention is generally directed to powder coatings comprising a film-forming resin, a crosslinker, and polymer additives that are the reaction product of an epoxy resin and a lactone. The epoxy resin is generally linear with one or more pendant hydroxyl groups. One or more of these hydroxyl groups are reacted with lactone, as described below.

The powder coatings of the present invention will often demonstrate increased flexibility and may have increased toughness; the present powder coatings also may have improved flow and leveling characteristics and decreased gassing as compared with powder coatings lacking the polymer additives described herein.

DETAILED DESCRIPTION OF THE INVENTION

The present invention is directed to powder coating compositions that comprise a film-forming resin, a crosslinker, and a polymer additive. One or more film-forming resins, crosslinkers and/or polymer additives can be used within the scope of the present invention. The polymer additive comprises the reaction product of an epoxy resin having pendant hydroxyl groups and a lactone. The reaction product of the epoxy resin and the lactone is sometimes referred to herein as the "comb polymer".

The epoxy resins used herein can be ungelled polymers comprised of glycidated bisphenol A reaction products. Suitable epoxy resins can be made, for example, by the step-growth polymerization of bisphenol A with bisphenol A diglycidyl ethers. The step-growth addition process generates hydroxy groups along the backbone and these groups function as the initation points for the polymerization of the lactone chains. The epoxy resins used herein are generally linear, but branched epoxy starting materials can be used. Suitable epoxy resins having pendant hydroxyl groups are commercially available from Resolution Performance Products, LLC in their EPON line of products.

The epoxy resins used according to the present invention will typically have a number average molecular weight of about 1,000 to 20,000, such as 3,000 to 9,000, as determined by gel permeation chromatography using linear polystyrene standards. In addition, they will typically have an epoxide equivalent weight of 1,000 to 10,000, such as 2,000 to 4,500.

The epoxy resin having hydroxyl functionality is then further reacted with a lactone. The lactones can be substituted or unsubstituted. It will be appreciated that lactides are specific lactones and are within the present invention. Particularly suitable lactones are epsilon-caprolactones, such as methyl epsilon-caprolactone, a mixture of isomeric methyl caprolactones or a mixture of isomeric methyl epsilon-caprolactones with epsilon-caprolactone. Other examples include but are not limited to octanoic lactones, butyrolactones, valerolactones, gluconolactones, oxycyclotridecane-2-ones, and pentadeca-lactones.

The lactone is attached or grafted to the epoxy resin through the ring opening polymerization of the lactone initiated by the hydroxyl group(s) of the epoxy resin. The results of this grafting is the "comb polymer" according to the present invention. The grafting step is accomplished by charging the lactone to the reaction vessel and heating the mixture to a temperature suitable for the ring opening reaction, typically 80 to 250° C. An additional catalyst can also be added. As a result of the grafting procedure, between 1 and 100 percent of the hydrbxyl functional groups on the epoxy resin will have a linear polymer chain comprised of at least one lactone molecule attached thereto. Typically, the large majority (i.e. greater than 50 percent, such as greater than 65 percent or 80 percent or greater) of the groups will be reacted. The linear polymer chains comprised of at least one lactone molecule that become attached will have a terminal hydroxyl group. Thus, the comb polymer itself also has hydroxyl functionality. Using a large excess of lactone can force the grafting to occur at ~100% of the hydroxyl groups on the epoxy resin. A 5 to 50 fold excess of lactone to hydroxyl functional groups can be used, as can about a 20 fold excess. In certain embodiments, the amount of lactone units per epoxy equivalent ranges from 5 to 500, such as 100 to 300 or 120 to 200.

The reaction between the hydroxyl group(s) on the epoxy resin with the lactone will result in opening of the lactone ring in the normal manner to produce a hydroxyl terminated lactone,.the other end of which will be attached to the epoxy resin. The hydroxyl terminated lactone chain may react with further lactone molecules to produce a hydroxyl terminated polylactone side chain. A "lactone chain" therefore refers to a hydroxyl terminated side chain that results from "ring opening" the lactone; a lactone chain according to the present invention can contain one or more lactone-derived units. In determining the ratio of lactone to epoxy resin to use, consideration should be given to the amount of lactone needed to give the desired average lactone chain length. Generally, the lactone chain length may be increased indefinitely. Typically, the lactone does not merely polymerize on to a few hydroxyl groups of the epoxy resin to produce several long lactone chains but rather the lactone molecules are distributed among a large number of hydroxyls. As noted above, typically greater than 50 percent, such as greater than 65 percent or even 80 percent or greater of the hydroxyl functional groups of the epoxy resin have a lactone chain attached thereto, although the invention is not so limited. The amount of lactone added (expressed as a weight percentage of the total weight of the comb polymer—both epoxy resin and lactone side-chains) is typically from 10 to 95 percent, such as 65 to 95 percent. Lactone chains comprised of 2 to 50 lactone units are particularly suitable for use in powder coatings.

The weight average molecular weight of the comb polymer of the present invention will typically be about 5,000 to about 500,000, such about 25,000 to 250,000, as determined by gel permeation chromatography using linear polystyrene standards. These comb polymers are also characterized by melting temperatures in the range of about 40 to about 65° C. The epoxy equivalent of the comb polymer will vary depending on the amount of lactone used, but will typically range from 2 to 20 times higher than the epoxy equivalent of the epoxy resin itself. In a particularly suitable embodiment, the epoxy equivalent weight of the comb polymer is 10,000 to 150,000, such as 20,000 to 60,000.

In addition to the one or more comb polymers as described above, the present powder coatings further comprise a film-forming resin. Any resin that forms a film can be used according to the present invention, absent compatibility problems. A particularly suitable resin for use in the present powder compositions is one formed from the reaction of a polymer having at least one type of reactive functional group and a curing agent having functional groups reactive with the functional group of the polymer. The polymers can be, for example, acrylic, polyester, polyether or polyurethane, and can contain functional groups such as hydroxyl, carboxylic acid, carbamate, isocyanate, epoxy, amide and carboxylate functional groups.

The use in powder coatings of acrylic, polyester, polyether and polyurethane polymers having hydroxyl functionality is known in the art. Monomers for the synthesis of such polymers are typically chosen so that the resulting polymers have a glass transition temperature ("Tg") greater than 50° C. Examples of such polymers are described in U.S. Pat. No. 5,646,228 at column 5, line 1 to column 8, line 7, incorporated by reference herein.

Acrylic polymers and polyester polymers having carboxylic acid functionality are also suitable for powder coatings. Monomers for the synthesis of acrylic polymers having carboxylic acid functionality are typically chosen such that the resulting acrylic polymer has a Tg greater than 40° C., and for the synthesis of the polyester polymers having carboxylic acid functionality such that the resulting polyester polymer has a Tg greater than 50° C. Examples of carboxylic acid group-containing acrylic polymers are described in U.S. Pat. No. 5,214,101 at column 2, line 59 to column 3, line 23, incorporated by reference herein. Examples of carboxylic acid group-containing polyester polymers are described in U.S. Pat. No. 4,801,680 at column 5, lines 38 to 65, incorporated by reference herein.

The carboxylic acid group-containing acrylic polymers can further contain a second carboxylic acid group-containing material selected from the class of C4 to C20 aliphatic dicarboxylic acids, polymeric polyanhydrides, low molecular weight polyesters having an acid equivalent weight from about 150 to about 750, and mixtures thereof. This material is crystalline and is preferably a low molecular weight crystalline or glassy carboxylic acid group-containing polyester.

Also useful in the present powder coating compositions are acrylic, polyester and polyurethane polymers containing carbamate functional groups. Examples are described in WO Publication No. 94/10213, incorporated by reference herein. Monomers for the synthesis of such polymers are typically chosen so that the resulting polymer has a high Tg, that is, a Tg greater than 40° C. The Tg of the polymers described above can be determined by differential scanning calorimetry (DSC).

Suitable curing agents generally include blocked isocyanates, polyepoxides, polyacids, polyols, anhydrides, polyamines, aminoplasts and phenoplasts. The appropriate curing agent can be selected by one skilled in the art depending on the polymer used. For example, blocked isocyanates are suitable curing agents for hydroxy and primary and/or secondary amino group-containing materials. Examples of blocked isocyanates are those described in U.S. Pat. No. 4,988,793, column 3, lines 1 to 36, incorporated by reference herein. Polyepoxides suitable for use as curing agents for COOH functional group-containing materials are described in U.S. Pat. No. 4,681,811 at column 5, lines 33 to 58, incorporated by reference herein. Polyacids as curing agents for epoxy functional group-containing materials are described in U.S. Pat. No. 4,681,811 at column 6, line 45 to column 9, line 54, incorporated by reference herein. Polyols, materials having an average of two or more hydroxyl groups per molecule, can be used as curing agents for NCO functional group-containing materials and anhydrides, and are well known in the art. Polyols for use in the present invention are typically selected such that the resultant material has a Tg greater than about 50° C.

Anhydrides as curing agents for epoxy functional group-containing materials include, for example, trimellitic anhydride, benzophenone tetracarboxylic dianhydride, pyromellitic dianhydride, tetrahydrophthalic anhydride, and the like as described in U.S. Pat. No. 5,472,649 at column 4, lines 49 to 52, incorporated by reference herein. Aminoplasts as curing agents for hydroxy, COOH and carbamate functional group-containing materials are well known in the art. Examples of such curing agents include aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The film-forming resin described above is generally present in the powder coatings of the invention in an amount greater than about 50 weight percent, such as greater than about 60 weight percent, and less than or equal to 95 weight percent, with weight percent being based on the total weight of the composition. For example, the weight percent of resin can be between 50 and 95 weight percent. When a curing agent is used, it is generally present in an amount of up to 30 weight percent; this weight percent is also based on the total weight of the coating composition.

It will be appreciated that the hydroxyl functionality that results from the lactone addition may react with one or more of the other components of the powder coating composition. For example, if the comb polymer has hydroxyl functionality at the end of a lactone chain, a blocked isocyanate crosslinker and a hydroxy functional film forming resin can be used.

It is also possible, according to the present invention, to modify the functionality that is present on the comb polymer. For example, the hydroxy functionality that results from lactone grafting can be converted to an acidic functionality, by reacting the hydroxy, for example, with a cyclic carboxylic acid anhydride. This reaction can be carried out by charging the hydroxy functional comb polymer to the reaction vessel and heating the mixture to a temperature suitable for the ring opening of the cyclic anhydride, such as 80 to 150° C. In this manner, the hydroxy functional comb polymer is converted to an acid functional comb polymer. This conversion may be relevant in a system wherein a curing agent that is reactive with a carboxylic acid functional group is desired rather than a curing agent that is reactive toward a hydroxy functional group, such as in a system using triglycidyl isocyanurate. Other moieties as desired by the user could also be introduced: through reaction with the terminal hydroxy on the comb polymer. One embodiment of the present invention specifically excludes carboxylic acids, ionic groups that aid in solubility in water such as acids, amides, or other compounds being attached to the end of the lactone chain. Another embodiment specifically excludes the use of epoxy resins that have been chain extended by reaction of the terminal oxirane groups with amines, either before or after grafting with lactone. One embodiment of the invention specifically excludes polycarboxylic acid anhydride in the coating composition. In another embodiment, the film-forming resin does not comprise epoxy groups.

The additive of the present invention is typically present in the curable powder coating composition in an amount ranging from 0.1 to 20 weight percent, such as 1 to 10 weight percent, or about 5 weight percent, with weight percent based on total weight of the coating composition; in one embodiment, the weight percent of the additive is less than 20 weight percent and in another it is less than 10 weight percent. As used herein, "curable coating composition", "cured coating composition" and like terms will be understood as referring to a composition in which the components react with each other so as to resist melting upon heating. It will be appreciated that inclusion of the present additives or comb polymers in the powder coatings of the present invention will result in at least one improvement to the performance characteristics of the present powder coatings, such as improved flow and/or improved leveling, decreased gassing, increased flexibility, and/or improved appearance. Even slight improvements in any of these characteristics are deemed an improvement according to the present invention. Moreover, gloss can be more easily varied with the coatings of the present invention. It will be further appreciated that the polymer additives or comb polymers used in the powder coatings of the present invention are used in additive quantities. That is, they are not used in quantities sufficient to form a film themselves; an additional quantity of a separate film-forming resin should be used in a sufficient quantity to form a film. Thus, the "film-forming resin" as used herein does not refer to the comb polymer.

The powder coating compositions of the present invention may optionally contain other additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba Specialty Chemicals Corporation under the trademarks IRGANOX and TINUVIN. These optional additives, when used, can be present in amounts up to 20 percent by weight, based on total weight of the coating.

The compounds of the present invention, as well as any additional additives, can be added at any time during the formulation of the powder coating. For example, curable powder coating compositions of the present invention can be prepared by first dry blending the film-forming resin, and any of the additives described above including the present compounds, in a blender, such as a Henschel blade blender. The blender is operated for a period of time sufficient to result in a homogenous dry blend of the materials. The blend is then melt blended in an extruder, such as a twin screw co-rotating extruder, operated within a temperature range sufficient to melt but not gel the components. The melt blended curable powder coating composition is typically milled to an average particle size of from, for example, 15 to 80 microns. Other methods known in the art for preparing powder coatings can also be used.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils, usually about 2 to 4 mils. Other standard methods for coating application can be employed such as brushing, dipping or flowing.

Generally, after application of the coating composition, the coated substrate is baked at a temperature sufficient to cure the coating. Metallic substrates with powder coatings are typically cured at a temperature ranging from 230° F. to 650° F. for 30 seconds to 30 minutes.

In certain embodiments, the present coating compositions comprise comb polymers that are the reaction product of the epoxy resin and lactone that has terminal hydroxy groups or whose terminal hydroxy groups have been converted to acid groups; the comb polymers do not have any additional moieties attached thereto. In certain embodiments the comb polymer used in the present coatings does not contain a UV curable moiety, such as (meth)acrylate.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

Example 1

An epoxy resin grafted with caprolactone-based chains was prepared as follows:

To 225 parts by weight of a commercially available epoxy resin (EPON 1009, from Resolution Performance Products, LLC) was added 3.40 parts by weight of stannous octoate and 1474.1 parts by weight of ε-caprolactone. The resultant mixture was heated to react in a nitrogen atmosphere at a temperature of 160° C. The reaction was allowed to progress for 4 hours at that temperature.

The reaction product was then cooled, discharged and analyzed. The determined acid value was 2.4 mg KOH/gram, and hydroxy value was 30.6 mg KOH/gram. Analysis of the polymer by GPC (using linear polystyrene standards) showed the polymer to have an Mw value of 85,081, and an Mn value of 21,962. The melting temperature was determined to be 42.7° C. by differential scanning calorimetry.

Example 2

An epoxy resin grafted with caprolactone-based chains modified with: anhydride was prepared as follows:

To 225 parts by weight of EPON 1009 was added 3.40 parts by weight of stannous octoate and 1474.1 parts by weight of ε-caprolactone. The resultant mixture was heated to react in a nitrogen atmosphere at a temperature of 180° C. The reaction was allowed to progress for 4 hours at that temperature. The reaction was then cooled to 120° C. and 71.4 parts by weight of hexahydrophthalic anhydride were added. The reaction was allowed to progress until no anhydride groups were detected by Infrared spectroscopy analysis of the material.

The reaction product was then cooled, discharged and analyzed. The determined acid value was 20.4 mg KOH/gram, and hydroxy value was 19.3 mg KOH/gram. Analysis of the polymer by GPC (using linear polystyrene standards) showed the polymer to have an Mw value of 99,295, and an Mn value of 21,562. The melting temperature was determined to be 55.1° C. by differential scanning calorimetry.

Example 3

An epoxy resin grafted with caprolactone-based chains modified with anhydride was prepared as follows:

To 375 parts by weight of EPON 1009 was added 3.46 parts by weight of stannous octoate and 1228.4 parts by weight of ε-caprolactone. The resultant mixture was heated to react in a nitrogen atmosphere at a temperature of 160° C. The reaction was allowed to progress for 4 hours at that temperature. The reaction was then cooled to 120° C. and 124.46 parts by weight of hexahydrophthalic anhydride were added. The reaction was allowed to progress until no anhydride groups were detected by Infrared spectroscopy analysis of the material.

The reaction product was then cooled, discharged and analyzed. The determined acid value was 30.3 mg KOH/gram. Analysis of the polymer by GPC (using linear polystyrene standards) showed the polymer to have an $M_w$ value of 155,139, and an $M_n$ value of 21,594. The melting temperature was determined to be 38.1° C. by differential scanning calorimetry.

Example 4

An epoxy resin grafted with caprolactone-based chains modified with anhydride was prepared as follows:

To 160 parts by weight of a commercially available epoxy resin (EPON 2002, from Resolution Performance Products, LLC) was added 3.33 parts by weight of stannous octoate and 1455.3 parts by weight of ε-caprolactone. The resultant mixture was heated to react in a nitrogen atmosphere at a temperature of 185° C. The reaction was allowed to progress for 4 hours at that temperature. The reaction was then cooled to 120° C. and 49.2 parts by weight of hexahydrophthalic anhydride were added. The reaction was allowed to progress until no anhydride groups were detected by Infrared spectroscopy analysis of the material.

The reaction product was then cooled, discharged and analyzed. The determined acid value was 11.0 mg KOH/gram. Analysis of the polymer by GPC (using linear polystyrene standards) showed the polymer to have an Mw value of 278,608, and an Mn value of 36,249. The melting temperature was determined to be 42.4° C. by differential scanning calorimetry.

Example 5

An epoxy resin grafted with caprolactone and valerolactone based chains was prepared as follows:

To 125 parts by weight of EPON 1009 was added 1.95 parts by weight of stannous octoate, 737.1 parts by weight of ε-caprolactone and 71.8 parts by weight of δ-valerolactone. The resultant mixture was heated to react in a nitrogen atmosphere at a temperature of 160° C. The reaction was allowed to progress for 4 hours at that temperature. The reaction was then cooled to 120° C. and 71.4 parts by weight of hexahydrophthalic anhydride were added. The reaction was allowed to progress until no anhydride groups were detected by infrared spectroscopy analysis of the material.

The reaction product was then cooled, discharged and analyzed. The determined acid value was 20.5 mg KOH/gram, and hydroxy value was 13.1 mg kOH/gram. Analysis of the polymer by GPC (using linear polystyrene standards) showed the polymer to have an Mw value of 134,643, and an Mn value of 22,802. The melting temperature was determined to be 39.9° C. by differential scanning calorimetry.

Example 6

Powder coating samples were prepared using the ingredients and amounts (in grams) shown in Table A. The samples were prepared as follows. The ingredients were weighed together and processed for ~20 s in a Prism blender at 3500 rpm's. This premix was then extruded through a b&p Process Equipment and Systems 19 mm, co-rotating, twin screw extruder at 450 rpm's, at temperatures ranging from 100° C. to 130° C. The resultant chip was milled and classified-to a median particle size of 30 to 50 μm on a Hosokawa Micron Powder Systems Air Classifying Mill I. The formulas were then electrostatically sprayed using Nordson corona equipment onto substrate supplied by ACT Laboratories as B-1000 P60 DIW, nonpolished panels. The powder formulations were baked for a dwell time of 23 minutes at 380° F. All testing was run at a dry film thickness of 2.5 to 3.0 mils.

TABLE A

| Material | Sample 1 | Sample 2 | Sample 3 |
| --- | --- | --- | --- |
| CRYLCOAT 690[1] | 420.0 | 378.0 | 399.0 |
| Product from Example 1 | — | 60.0 | 30.0 |
| VESTAGON EP-B 1400[2] | 74.1 | 74.1 | 74.1 |
| BUTAFLOW BT-71[3] | 1.5 | 1.5 | 1.5 |
| Benzoin | 3.0 | 3.0 | 3.0 |
| RESIFLOW PL-200[4] | 7.0 | 7.0 | 7.0 |
| TiO$_2$ R706[5] | 225.0 | 225.0 | 225.0 |
| Powder Stability 7 day @ 32° C.[6] | Excellent | Slightly Cakey | Excellent |

TABLE A-continued

| Material | Sample 1 | Sample 2 | Sample 3 |
|---|---|---|---|
| Impact (direct/reverse)(in-lbs)[7] | 20/<20 | 100/160 | 60/160 |
| MEK (50 double rubs)[8] | 6 | 6 | 6 |

[1]Superdurable hydroxyl functional polyester from UCB Surface Specialties.
[2]ε-Caprolatam blocked isophorone diisocyanate from Degussa CRM.
[3]71% Dibutyltin dilaurate on silica support, from Estron Chemical.
[4]Acrylic flow additive dispersed on silica, from Estron Chemicals.
[5]Available from DuPont.
[6]Powder stability was tested by filling a 2 oz. glass jar half full of powder, sealing it, and placing it into a controlled temperature water bath at the designated temperature for a specified amount of time. At the completion of the testing, the sample was allowed to rest outside of the bath for 30 minutes. The jar was then rapped upside down on a hard surface 2 to 3 times and the condition of the powder was rated as follows: Excellent > Good > Slightly Cakey > Cakey > Slight Clumpy > Clumpy > Fused > Sintered.
[7]Impact testing was run according to ASTM D 2794 using a Byk-Gardner Falling Dart Impact tester.
[8]MEK resistance was run by rubbing a Q-tip soaked with methyl ethyl ketone back and forth across a panel (one double rub) 50 times and then rating the resulting marks as follows:
MEK rating system:
0 No change
1 Slight gloss loss around test area
2 Barely detectable gloss loss in test area
3 Barely detectable scuffing of test area
4 Slightly detectible scuffing of test area
5 Noticeable scuffing of test area
6 Marring of test area
7 Smearing of test area
Readings of 0-5 are generally regarded as acceptable.

As can be seen in Table A, the coatings incorporating the present additives had better impact resistance than a coating lacking the additives, without significant, or in some cases any, sacrifice of other desirable coating properties.

Example 7

Powder coating samples were prepared using the ingredients and amounts (in grams) shown in Table B. The samples were prepared as described in Example 6, except that the control (Sample 4) was sprayed onto panels supplied by ACT Laboratories as B-1000 P60 DIW, nonpolished panels which were first coated in the lab with P-590 electrocoat available from PPG Industries, Inc. All other samples were sprayed on substrated supplied by ACT Laboratories as APR 45254. The powder formulations were baked for a dwell time of 25 minutes at 375° F. All testing was run at a dry film thickness of 2.5 to 3.0 mils.

TABLE B

| Material | Sample 4 | Sample 5 | Sample 6 | Sample 7 | Sample 8 |
|---|---|---|---|---|---|
| CRYLCOAT 630[9] | 502.8 | 494.5 | 491.6 | 498.2 | 494.1 |
| Product from Example 2 | — | 15.0 | — | — | — |
| Product from Example 3 | — | — | 15.0 | — | — |
| Product from Example 4 | — | — | — | 15.0 | — |
| Product from Example 5 | — | — | — | — | 15.0 |
| Triglycidylisocyanurate[10] | 37.8 | 37.8 | 37.8 | 37.8 | 37.8 |
| VESTAGON BF 1540[11] | 21.0 | 21.0 | 21.0 | 21.0 | 21.0 |
| ACTIRON 32-057[12] | 1.4 | 1.4 | 1.4 | 1.4 | 1.4 |
| Benzoin | 5.6 | 5.6 | 5.6 | 5.6 | 5.6 |
| RESIFLOW PL-200 | 7.0 | 7.0 | 7.0 | 7.0 | 7.0 |
| IRGANOX 1076[13] | 8.4 | 8.4 | 8.4 | 8.4 | 8.4 |
| TiO$_2$ R706 | 150.0 | 150.0 | 150.0 | 150.0 | 150.0 |
| Powder Stability 7 day @ 32° C. | Good | Good | Good | Excellent | Good |
| Impact (direct/reverse)(in-lbs) | 60/<20 | 90/120 | 100/160 | 90/100 | 120/160 |
| MEK (50 double rubs) | 6 | 2 | 4 | 5 | 4 |

[9]Superdurable carboxylic acid functional polyester from UCB Surface Specialties.
[10]Available from Vantico Inc.
[11]Self-blocked isophorone diisocyanate from Degussa CRM.
[12]Dimethyl lauryl amine on silica support, from Synthron Inc.
[13]Antioxidant, from CIBA Specialty Chemicals.

As demonstrated in Table B, the coatings comprising the present additives had better impact resistance, better solvent resistance, and comparable if not better powder stability as compared with the control.

Whereas particular embodiments of this invention have been described above for purposes of illustration, it will be evident to those skilled in the art that numerous variations of the details of the present invention may be made without departing from the invention as defined in the appended claims.

Therefore, what is claimed is:

1. A curable powder coating composition comprising:
    (a) a compound that comprises the reaction product of an epoxy resin having at least one hydroxyl group and a lactone, wherein the compound has a melting temperature in the range of about 40 to about 65° C.;
    (b) a film-forming resin; and
    (c) a crosslinker.

2. The composition of claim 1, wherein the epoxy resin has a number average molecular weight of 1,000 to 20,000.

3. The composition of claim 2, wherein the epoxy resin has a number average molecular weight of 3,000 to 9,000.

4. The composition of claim 1, wherein the epoxy resin has an epoxide equivalent weight of 500 to 20,000.

5. The composition of claim 4, wherein the epoxy resin has an epoxide equivalent weight of 1,000 to 10,000.

6. The composition of claim 5, wherein the epoxy resin has an epoxide equivalent weight of 2,000 to 4,500.

7. The composition of claim 1, wherein 1 to 100 percent of the hydroxyl groups have a lactone grafted thereto.

8. The composition of claim 7, wherein greater than 90 percent of the hydroxyl groups have a lactone grafted thereto.

9. The composition of claim 1, wherein the reaction product of the epoxy resin and the lactone has a weight average molecular weight of 5,000 to 500,000.

10. The composition of claim 9, wherein the reaction product of the epoxy resin and the lactone has a weight average molecular weight of 25,000 to 250,000.

11. The compound of claim 1, wherein the lactone comprises epsilon-caprolactone.

12. The composition of claim 1, wherein the reaction product of the epoxy resin and the lactone comprises lactone chains comprising 1 to 50 lactone derived units.

13. The composition of claim 1, wherein the film forming resin is hydroxy functional.

14. The composition of claim 13, wherein the film-forming resin comprises polyester.

15. The composition of claim 1, wherein the film-forming resin does not comprise epoxy.

16. The composition of claim 1, wherein the film forming resin is present in an amount of 50 weight percent or greater, based on total weight of the composition.

17. The composition of claim 1, wherein the reaction product of epoxy resin and lactone is present an amount of 0.1 to 20 weight percent.

18. The composition of claim 17, wherein the reaction product of epoxy resin and lactone is present in an amount of 2 to 8 weight percent.

19. The composition of claim 1, wherein the lactone does not have an amine grafted thereto.

20. The composition of claim 1, wherein the lactone does not have an acid grafted thereto.

21. The composition of claim 1, wherein the epoxy equivalent weight of the compound (a) is 10,000 to 150,000.

22. The composition of claim 1, wherein the epoxy resin is not chain extended by reaction of the terminal oxirane groups with amines.

* * * * *

UNITED STATES PATENT AND TRADEMARK OFFICE
CERTIFICATE OF CORRECTION

PATENT NO. : 7,323,521 B2  Page 1 of 1
APPLICATION NO. : 10/804684
DATED : January 29, 2008
INVENTOR(S) : Michael J. Ziegler et al.

It is certified that error appears in the above-identified patent and that said Letters Patent is hereby corrected as shown below:

Cover page, item [73] change the first word of the name of the Assignee from "PP6" to --PPG--.

Signed and Sealed this

Thirteenth Day of May, 2008

JON W. DUDAS
*Director of the United States Patent and Trademark Office*